United States Patent [19]

Lindberg

[11] Patent Number: 4,631,027
[45] Date of Patent: Dec. 23, 1986

[54] METHOD AND APPARATUS FOR SHARPENING TUNGSTEN ELECTRODES

[76] Inventor: Charles H. Lindberg, 4294 Helm Rd., Duluth, Minn. 55811

[21] Appl. No.: 712,687

[22] Filed: Mar. 18, 1985

[51] Int. Cl.⁴ .............. F27B 14/00; B29C 35/02; B23K 7/00; F24J 3/00
[52] U.S. Cl. .............. 432/13; 264/80; 266/48; 432/230
[58] Field of Search .............. 432/13, 230; 264/80; 266/48; 219/68 R, 69 R, 121 PB, 121 PY

[56]  References Cited
U.S. PATENT DOCUMENTS 2,358,772  9/1944  Brow et al. .............. 266/48
2,517,661  8/1950  Hart .............. 264/80
2,526,624  10/1950  Adams .............. 266/48
2,659,181  11/1953  Yenni et al. .............. 264/80

Primary Examiner—John J. Camby
Attorney, Agent, or Firm—Douglas L. Tschida

[57] ABSTRACT

Apparatus for mounting a tungsten electrode in acute relation to the flame of an oxy-fuel cutting torch and permitting the rotation of the electrode during heating, such that the material is vaporized and removed as the electrode is shaped to a needle-like profile. A bearing containing clamp member secures the torch and electrode holder in proper relation to one another and permits the rotation of the electrode holder therein.

10 Claims, 3 Drawing Figures

METHOD AND APPARATUS FOR SHARPENING TUNGSTEN ELECTRODES

BACKGROUND OF THE INVENTION

The present invention relates to tungsten inert gas (TIG) welding and, in particular, to apparatus for sharpening the tungsten electrode used therewith to a needle-like point.

Within the welding industry, TIG welding is most commonly used during the welding of aluminum, chrome, copper, nickel, stainless steel, and high carbon steels. Depending upon the type of materials being welded and the application thereof, the best results are obtained via a proper selection of amperage and reverse or straight polarity to the electrode, the availability of a sufficient amount of inert gas (i.e. Argon or Helium) in the region of the weld, the maintenance of a uniform arc length, and the use of a finely-sharpened electrode.

While each of the mentioned factors, as well as others, can affect the weld quality, the latter factor or maintaining a sharp electrode presents an ongoing problem to the welder; especially during reverse polarity welding, since over time and use, the tip constantly loses its point and/or becomes contaminated with splattered material. The electrode then loses its ability to confine the arc and electric energy to the desired application site. Depending upon the material being welded, the criticality of this factor can vary, but for harder materials, such as stainless steel, it becomes especially important. In fact, in applications such as nuclear power plants, TIG welding is routinely done by teams of welders and in support of which some individuals do nothing other than make available sharpened electrodes to the welders so as to facilitate work output.

The tungsten electrodes used in TIG welding are most commonly manufactured in lengths of 3, 6, 7, 12 and 18 inches and diameters from 0.04 to ⅜ inch. Depending upon the length, the electrodes are oftentimes broken in half, before the ends are sharpened to the desired point. The electrode then being mounted in the hand-held welding holder.

Sharpening, in turn, presents a number of considerations, in that depending upon the work, either more or less taper may be desired. In all cases, however, it is desirable to maintain the point as close as possible to the concentric center to the electrode and to minimize surface imperfections, such as abrasions, etc. and which can affect the weld quality. Heretofore and most typically, the electrode have been sharpened using abrasive techniques so as to wear away the electrode in a tapered fashion relative to an abrading wheel of an appropriate grit. For example, one such device is sold by Hobart Inc. In use, the electrode is typically chucked into a hand drill and mounted to the apparatus relative to a grinding wheel so that upon rotating the electrode and passing the grinding wheel over the electrode, a tapered point is eventually achieved. The problem with this method and apparatus, however, is that the sharpening equipment is rather costly and the process rather time consuming.

Yet another methodology that has been developed for sharpening such electrodes is a chemcial technique developed by Kemsharp Inc. and which relies upon the heating of the electrode before immersing and drawing the electrode from a chemical bath. Given the cost of the chemical bath and its limited useful life, this methodology, too, does not represent the optimal solution.

In order to overcome the limitations of the foregoing sharpening methodologies, the present invention was developed and which provides a means for flame sharpening the electrode to a properly profiled point, in less than a minute, using available equipment. In general terms, it achieves this end by mounting the electrode in acute relation to the flame of a cutting torch while rotating the electrode so as to controlably vaporize the electrode to a desired point.

While flame sharpening techniques have been employed in various technologies, for example glassworking, it is not believed that heretofore such techniques have been applied in the welding arts and especially not in the fashion or with the apparatus presently contemplated. One reference, however, that applicant is aware of from the glassworking arts is U.S. Pat. No. 2,659,181 and wherein one or more flames from an oxy-gas device are applied generally orthogonally to a mechanically preformed stylus, before rotating the stylus and progressively moving it through the flames so as to produce a heat-glossed surface and a rounded tip, such as might be used with a stylus of a phonograph cartridge.

As should be apparent, however, the present invention is intended to produce a relatively finer and more tapered point and which it achieves via substantially different apparatus. The above objects, advantages and distinctions, among others, as well as the construction of the present invention will, however, become more apparent upon reference to the following description thereof with respect to the appended drawings. Before referring thereto, though, it is to be recognized that the following description is made by way of reference to the presently preferred embodiment only, but which is not intended to be limiting of the scope thereof.

SUMMARY OF THE INVENTION

Apparatus and a method for mounting a tungsten electrode in acute relation to the flame of an oxy-acetylene cutting torch so that the flame impinges on the electrode. Upon heating the electrode to its vaporization point, while rotating the electrode relative to the flame, controllable amounts of material are vaporized so as to produce a needle-like point at a desired taper.

As presently contemplated, the apparatus comprises an attachment block mountable to an appropriately sized cutting tip of an oxy-acetylene cutting torch. Specifically, the tip is secured in a first bore of the block via thumb-actuated set screw assembly. An electrode holder is rotatively mounted in a second, sleeve bearing containing bore of the block in aligned acute relation to the flame. By rotating the holder, material is uniformly vaporized from the electrode. The tapered profile of the electrode is, in turn, controlled by varying the total amount of material vaporized.

The electrode holder comprises a spring loaded collet containing device which accepts and restrains the electrode relative to the flame and the attachment block. A thumb-actuated coaxial spring-loaded plunger coupled to the collet enables the expansion and contraction of the collet jaws and the insertion of the electrode therein to an appropriate depth.

DESCRIPTION OF THE PREFERRED EMBODIMENT

Figure 1:
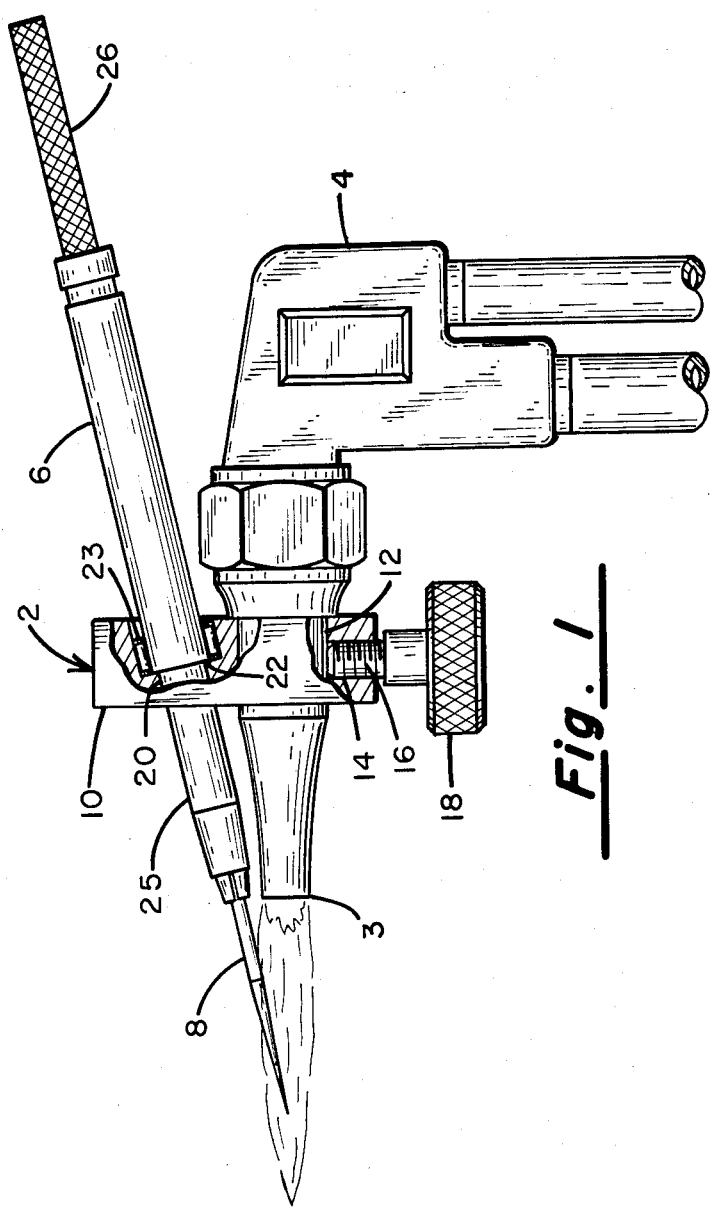
FIG. 1 shows a perspective assembly view in partial cut-away of the present sharpening apparatus relative to a conventional oxy-acetylene cutting torch.
Figure 3:
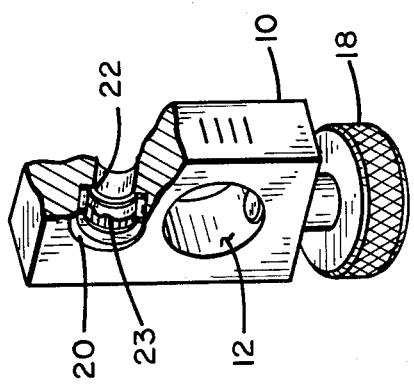
FIG. 3 shows a perspective view of the torch attachment block in partial cut-away.

Referring to FIG. 1, an assembly view of the present sharpening apparatus is shown in partial cut-away and in mounting relation to a conventional oxy-acetylene cutting torch. As depicted, the apparatus is presently intended for non-automated usage, but as will become more apparent hereinafter, it may be adapted to a stationary mounting so as to permit volume sharpening such as in the previously mentioned conditions where it is one individual's sole responsibility to supply sharpened electrodes to a number of welders. The more typical setting in which the present invention finds application, however, is that of the home or smaller commercial or custom shops that are equipped to do TIG welding on a more limited basis. For these instances and as presently contemplated, the present invention comprises a clamp assembly 2 that mounts to the tip 3 of the cutting torch 4 and which positions and rotatively supports an electrode holder 6 and coaxially mounted electrode 8 in acutely aligned relation to the torch flame. As presently contemplated, an oxy-acetylene cutting torch 4 would be used to provide a necessary heat source to vaporize the tungsten electrode 8, although it is to be recognized that any other torch capable of achieving temperatures in excess of approximately 5500° F. would be acceptable. Depending then upon the type and dimensions of the torch tip 3 the clamping assembly 2 would be appropriately adjusted to be compatible therewith.

In the present embodiment, the clamping assembly 2 comprises a metallic torch block 10 that is machined to include a bore 12 for receiving the torch tip 3 and relative to which bore 12 an intersecting tapped bore 14 is let into the block 10. A set screw 16 mounts within the threaded bore 16 and secures the torch tip 3 to the block 10, upon tightening the thumb screw 18.

A third bore 20 is machined through the torch block 10 at an acute angle to the centerline through the bore 12 and which is machined to accept the electrode holder 6. Specifically, the bore 20 is formed with a stop shoulder 22 such that a mating shoulder on the electrode holder 6 fixes the maximum depth of insertion of the electrode holder 6. As depicted, the electrode holder 6 would thus be restrained somewhat behind the torch flame so as to prevent against damage thereto. The length of electrode 8 exposed beyond the holder is then adjusted as desired relative to the flame. As presently contemplated, the torch block 10 may also include a scale on one side so as to permit the operator to adjust the length of exposed electrode 8 relative thereto. In any event, however, the electrode must extend a sufficient distance so as to be engulfed by the flame. In this regard too, it is to be noted that the present torch block 10 provides a 12½ degree angle of approach to the flame, although any other acute angle within a range of 10 to 20 degrees might be used with equal advantage, depending upon the tip profile desired.

With the present embodiment, it is also to be noted that the tip profile can also be varied by controlling the length to which the electrode 8 is extended into the flame and the amount of material vaporized. For example, given the electrode 8 shown, it is to be noted that by vaporizing more and more material from the electrode 8, the taper of the profile will become more and more blunt, until the electrode is burned back to the point where the flame temperature no longer vaporizes the electrode. Thus, for any given mounting angle, a variety of electrode profiles can be obtained. However, should other angles be desired, the angle of the bore 20 can be varied and/or the torch block 10 might be constructed in a hinged fashion so that the angle of the electrode can also be adjusted.

With continuing attention to FIG. 1, it is to be noted that mounted in concentric relation to the bore 20 is a sleeve bearing assembly 23 which contains a number of roller bearings, such that upon mounting the electrode holder 6 therein, it can be rotated freely. Thus, as the electrode holder 6 is rotated, the electrode material is evenly vaporized from the sides thereof, in lieu of forming a wedge-shaped tip.

Figure 2:
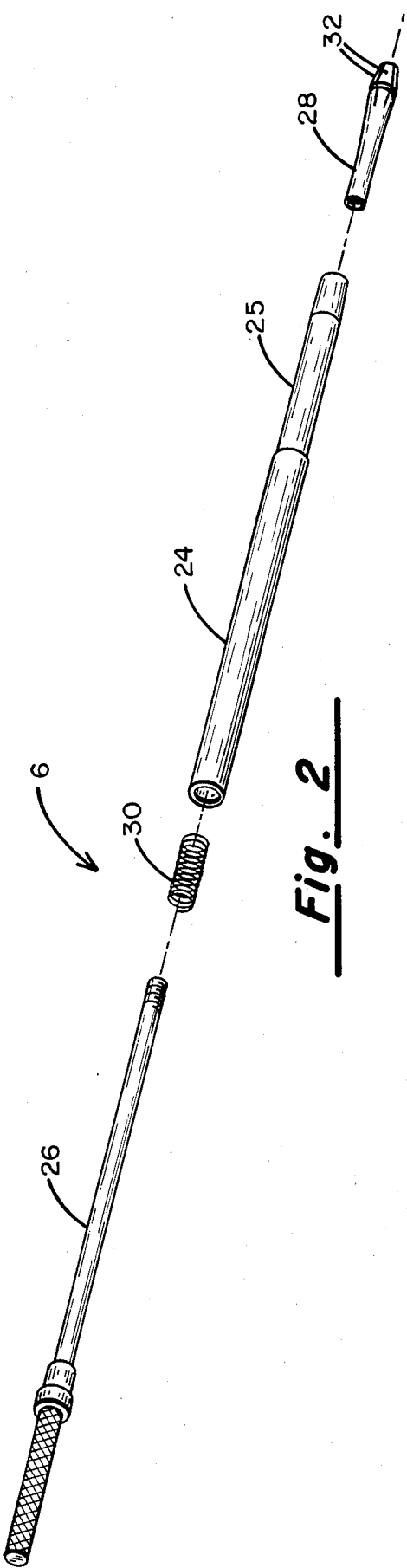
FIG. 2 shows an exploded assembly view of the electrode holder.

Turning attention next to FIG. 2, an exploded assembly view is shown of the electrode holder 6. The holder 6 is comprised of a hollow tubular body member 24 which includes a necked-down fore-end 25 that mounts in mating relation to the shoulder 22 of the torch block 10. Coaxially mounted within the body 22 is a thumb-actuated hollow plunger member 26 that is threadably secured to a tapered, jawed collet 28 that mounts within the fore-end 25. An intermediate coaxially mounted spring 30, spring-loads the plunger 26 relative to the collet 28 such that the jaws 32 of the collet 28 exert an inwardly directed compressive force. Upon depressing the plunger 26, the collet 28 is thereby pushed from the foreend 24 and which causes the jaws 32 to expand outwardly and permit the mounting of an electrode 8 therein. Depending upon the expansion permitted by the collet jaws 32, electrodes of a variety of diameters can be inserted into the collet 28 and which upon releasing the plunger member 26 is drawn back into the body member 22, while compressibly securing the electrode thereto. Depending upon the length of exposed electrode desired and because of the hollow construction of the plunger 26, the electrode 8 may be slid to and fro within the holder 6, before releasing the plunger member 26. Recalling too, the inclusion of a scale on the torch body 10, the length of the exposed electrode can be adjusted relative thereto.

In any case, once the electrode 8 is positioned in the holder 6 with a desired exposure, the holder 6 is mounted within the torch block 10. Before doing so, however, the torch block 10 would typically be mounted to the tip 3, the torch 4 ignited and the oxygen and the acetylene regulators set to desired pressures. In this regard, oxygen settings of 40 psi and acetylene settings of 10 psi and/or other oxydizing flame settings have been shown to produce suitable results for cutting tips of sizes 00 to 6. The holder 6 is next positioned within the torch block 10 and slowly rotated within the flame so as to achieve an evenness of heat. Once the electrode takes on a whitish glow, the electrode material begins to vaporize. Given the acute mounting angle of the electrode and which causes the electrode to be exposed to the different heat gradients of the torch flame, the material vaporizes in a corresponding fashion, with more material being vaporized in the hotter center region than in the cooler outer region. Thus, the electrode begins to take on a tapered profile and the concentricity of which is controlled by concurrently rotating the electrode holder 6. Once a desired tip is achieved, the holder can be removed and the electrode cooled. Alternatively, the heating process can be continued for longer periods and which causes more and more material to be vaporized, along with a corresponding change in profile. That is, the tip profile becomes more and more blunt as more and more material is removed. The end result being a finely sharpened electrode 8 and which sharpening operation is accomplished in only a matter of minutes, while being performed with available equipment. In this regard, it is also to be noted that for thoriated tungsten electrodes 8, a small ball of melted thorium may form at the electrode tip, but which can easily be broken off upon completing sharpening.

While the foregoing invention has been described with respect to a hand-held assembly, it is to be appreciated that the concept can readily be adapted to a bench-mounted version and, for example, which might include a fixture for restraining the torch 4 relative to a second fixture and whereat the electrode 8 would be secured. In such an arrangement, it is contemplated that the second fixture and/or the first fixture could be adjustably mounted relative to one another so as to vary the angle of the electrode 8 relative to the torch flame. In this way, the obtained profile could be further varied, depending upon the particular application. For example, given the TIG welding of aluminum, a more blunt point is desired rather than a sharper point as when welding steel with reverse polarity.

A further contemplated modification to the present invention might take the form of a two-part torch block, in the fashion of flaring clamps, and which could be appropriately mounted over cutting tips of different sizes. In this regard, too, one or more bores 20 could be provided therein with differing angles relative to the torch tip 3.

From the foregoing, it is therefore to be appreciated that the present invention has been described with respect to its presently preferred embodiment only. In addition to the various modifications suggested, still other modifications might suggest themselves to those of skill in the art without departing from the spirit and scope thereof. Accordingly, it is contemplated that the present invention and the following claims should be interpreted so as to include all those equivalent embodiments within the spirit and scope thereof.

What is claimed is:

1. Apparatus for flame sharpening a welding electrode comprising:
    (a) a heat source capable of producing flame temperatures in the ranges of 5900 to 6500 degrees Farenheit;
    (b) a block member having first and second bores formed therethrough, said second bore formed at an acute angle relative to said first bore, and wherein said heat source mounts through said first bore; and
    (c) means for rotatively mounting said electrode within said second bore in immersed vaporizing relation to the flame to produce a point of desired taper thereat.

2. Apparatus as set forth in claim 1 wherein said electrode is mounted at an acute angle in the range of 10 to 20 degrees relative to the flame.

3. Apparatus as set forth in claim 1 wherein said electrode is constructed of tungsten.

4. Apparatus as set forth in claim 1 including:
    (a) a third bore formed through said block member and opening to said first bore; and
    (b) a set screw mounted in said third bore for securing said block member to said heat source, upon tightening the set screw.

5. Apparatus as set forth in claim 1 including means for restraining said welding electrode at a desired exposure relative to the flame.

6. Apparatus as set forth in claim 5 wherein said electrode restraining means comprises:
    (a) a hollow tubular body member having a bore formed therethrough along a lengthwise axis;
    (b) a plunger member coaxially and slidably mounted in said bore;
    (c) a collet having a plurality of radially expandable jaws coupled to said plunger member and slidably mounted relative to said bore; and
    (d) spring means mounted in said bore in concentric relation to said plunger member for biasing said plunger member in a fashion so as to cause said collet jaws to compressively grasp a welding electrode coaxially inserted therethrough.

7. Apparatus as set forth in claim 1 wherein said heat source comprises an oxy-acetylene torch.

8. A method for flame sharpening a welding electrode including the steps of:
    (a) mounting a blunt welding electrode at an acute angle in the range of 10 to 20 degrees in engulfed relation to the flame of a heat source capable of temperatures in excess of 5500° F.; and
    (b) rotating the electrode as the electrode material is vaporized until a needle-like point profile is obtained.

9. Apparatus for flame sharpening a welding electrode comprising:
    (a) a heat source capable of producing flame temperatures in excess of 5500 degrees Farenheit;
    (b) means for mounting said welding electrode at an acute angle in the range of 10 to 20 degrees relative to the flame of said heat source so that the flame is able to engulf a predetermined length of said electrode in vaporizing relation thereto; and
    (c) means for rotating said electrode while immersed in said flame to produce a needle-like taper at the flame engulfed end thereof.

10. Apparatus for flame sharpening a welding electrode comprising:
    (a) a heat source capable of producing flame temperatures in excess of 5500 degrees Farenheit;
    (b) means for mounting said welding electrode at an acute angle in the range of 10 to 20 degrees relative to the flame of said heat source so that the flame is able to engulf a predetermined length of said electrode in vaporizing relation thereto; and
    (c) means for rotating said electrode while immersed in said flame to produce a needle-like taper at the flame engulfed end thereof comprising;
        (i) a hollow tubular body member having a bore formed therethrough along a longitudinal lengthwise axis,
        (ii) a plunger member coaxially and slidably mounted in said bore,
        (iii) a collet having a plurality of radially expandable jaws coupled to said plunger member and slidably mounted relative to said bore, and
        (iv) spring means mounted in said bore in concentric relation to said plunger member for biasing said plunger member to cause said collet jaws to compressively grasp a welding electrode coaxially inserted therein.

* * * * *